United States Patent [19]

Brown et al.

[11] 4,374,967

[45] Feb. 22, 1983

[54] LOW TEMPERATURE SILICONE GEL

[75] Inventors: Paul L. Brown, Saginaw; Chi-Long Lee; Myron T. Maxson, both of Midland, all of Mich.

[73] Assignee: Dow Corning Corporation, Midland, Mich.

[21] Appl. No.: 346,804

[22] Filed: Feb. 8, 1982

Related U.S. Application Data

[63] Continuation-in-part of Ser. No. 280,669, Jul. 6, 1981, abandoned.

[51] Int. Cl.$^3$ .............................................. C08G 77/06
[52] U.S. Cl. ..................................... 528/15; 525/478; 528/31; 528/32
[58] Field of Search ............................ 528/15, 31, 32; 525/478

[56] References Cited

U.S. PATENT DOCUMENTS

| | | | |
|---|---|---|---|
| 3,020,260 | 2/1962 | Nelson | 528/15 |
| 3,361,714 | 1/1968 | Omietanski | 528/33 |
| 3,436,366 | 4/1969 | Modic | 528/32 |

Primary Examiner—Melvyn I. Marquis
Attorney, Agent, or Firm—Roger H. Borrousch

[57] ABSTRACT

This invention relates to a novel low-temperature dielectric silicone gel which is the reaction product of a polyorganosiloxane consisting essentially of $Me_2SiO$, $MeSiO_{1.5}$, $Me_3SiO_{0.5}$ and $Me_2ViSiO_{0.5}$; an organohydrogensiloxane and a platinum catalyst.

10 Claims, No Drawings

LOW TEMPERATURE SILICONE GEL

This application is a continuation-in-part application of Ser. No. 280,669, filed July 6, 1981 and now abandoned.

BACKGROUND OF THE INVENTION

1. Field of the Invention

This invention relates to a unique siloxane composition which will cure to form a dielectric silicone gel. More specifically, the disclosed composition is especially formulated so that it will cure readily at ambient or elevated temperatures to form a silicone gel which can withstand very low temperatures (ca. $-120°$ C.) without a detrimental effect on the physical stability of the gel and its low temperature properties.

2. Description of the Prior Art

The principal use intended for the gels formulated according to the present invention is as a dielectric potting gel. The use of silicone potting compounds to encapsulate electrical assemblies is well documented. U.S. Pat. No. 3,436,366, issued Apr. 1, 1969, to Modic describes how silicone materials are used to provide electrical insulation and various degrees of protection from thermal and mechanical abuse. The Modic patent also describes the possibility of formulating a dielectric potting compound using a polyorganosiloxane having only methyl and vinyl substituents. However, those substituents are arranged in such a way so as to promote a great deal of crosslinking resulting in significant tear strength. In particular, Modic teaches using an organopolysiloxane having methylvinylsiloxane and $SiO_2$ units. Both of those units promote a high degree of crosslinking resulting in a product having very little in common with the supple gel of the present invention. Furthermore, the Modic material does not have the unique low temperature property exhibited by the gels of the present invention.

U.S. Pat. No. 3,020,260, issued Feb. 6, 1962, to Nelson is perhaps more relevant to the present invention. In Example 10 of that reference, a silicone gel formulated from siloxane copolymers having only methyl and vinyl substituents is described.

More precisely, the Nelson patent teaches a method of formulating a silicone potting gel by reacting a blend of 86.95 parts by weight of copolymer (I) consisting of $Me_2SiO$, $MeViSiO$ and $Me_3SiO_{.5}$ and 8.27 parts by weight of copolymer (II) consisting of $Me_2SiO$, $MeSiO_{1.5}$ and $Me_3SiO_{.5}$ with 4.78 parts by weight of an organohydrogensiloxane crosslinker in the presence of a platinum catalyst. The symbol "Me" represents a "—$CH_3$" radical and the symbol "Vi" represents a "—CH=$CH_2$" radical.

The silicone potting gel resulting from the Nelson formulation will form a dielectric silicone gel, but because of the ratios of the units employed and the presence of a unit having an internal vinyl function (MeViSiO), it will not have the structural properties and, hence, will not exhibit low-temperature stability of the siloxane gel prepared according to the present invention.

Omietanski in U.S. Pat. No. 3,361,714, issued Jan. 2, 1968, discloses certain "Comb" polymers and "Star" polymers having low temperature properties. These polymers are non-random polymers and have a generic formula

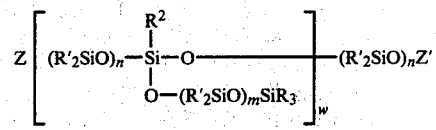

wherein R and R' are monovalent hydrocarbyl radicals, $R^2$ is a monovalent hydrocarbyl radical or substituted monovalent hydrocarbyl radical or substituted monovalent hydrocarbyl radical, n is 0 to 25, m is 1 to 21, w is greater than zero, Z' is hydrogen or $R_3Si$—, and Z is hydroxyl or $R_3SiO$—. Omietanski teaches that fluids and elastomers cured with organic peroxides can be obtained which exhibit low temperature properties.

Mindful of the properties and limitations of the silicone potting compounds known and described in the prior art, we endeavored to formulate a siloxane gel from a siloxane polymer having only methyl and vinyl substituents. However, these well-known units have been combined in such a manner so as to provide a novel polymeric composition which will cure rapidly to a gel at ambient or elevated temperatures and maintain its gel properties at very low temperatures.

SUMMARY OF THE INVENTION

Accordingly, we have developed a curable siloxane composition comprising an intimate mixture consisting essentially of:

(1) a polyorganosiloxane consisting essentially of 80 to 96.5 mol % of $(CH_3)_2SiO$, 2.0 to 10.0 mol % of $CH_3SiO_{0.5}$, 1.25 to 6.0 mol % of $(CH_3)_3SiO_{0.5}$, and 0.25 to 4.0 mol % of $(CH_3)(CH_2=CH)SiO_{0.5}$, (2) an organohydrogensiloxane having an average of more than one silicon-bonded hydrogen atom per molecule and no more than one silicon-bonded hydrogen atom per silicon atom and organic radicals selected from the group consisting of alkyl radicals having from one to six carbon atoms per radical, phenyl and 3,3,3-trifluoropropyl, said organohydrogensiloxane providing an average of 0.2 to 5.0 moles of silicon-bonded hydrogen per mole of silicon-bonded vinyl (1); and (3) a platinum catalyst.

DESCRIPTION OF THE PREFERRED EMBODIMENTS

The siloxane gel of the present invention is essentially a defined polyorganosiloxane which is cured with an organohydrogensiloxane crosslinker in the presence of a platinum catalyst.

The polyorganosiloxane is primarily comprised of dimethylsiloxane units ($Me_2SiO$). The presence of this particular unit can vary from 80 to 96.5 mol % of the total siloxane units in the polymer, but optimum results are achieved when the dimethylsiloxane units comprise above 90 mol % of the polymer.

A second unit of the polyorganosiloxane is monomethylsiloxane ($MeSiO_{1.5}$). This unit provides between 2 to 10.0 mol % of the total siloxane units in the polymer and good results have been achieved using $MeSiO_{1.5}$ in an amount equal to 3 to 6 mol % of the polymer.

The $MeSiO_{1.5}$ unit is essential to imparting the unique low temperature property to the siloxane polymer. Without monomethylsiloxane units, the polymer chain would be composed of dimethylsiloxane units only, and would crystallize at $-40°$ C. and remain in the hard crystalline phase at temperatures below −40° C. Monomethylsiloxane units randomly placed along the siloxane polymer chain enable the disclosed polymer to obviate the crystalline phase. Therefore, on cooling the novel siloxane polymers remain in the amorphous phase until the temperature reaches the glass transition temperature (Tg) of −123° C. The siloxane polymers change to a hard glass phase at this temperature.

A third unit is the trimethylsiloxane unit (Me$_3$SiO$_{0.5}$). This moiety functions simply as an endblocker for the polymer chain. This unit can be employed within a range of 1.25 to 6.0 mol % of the total organosiloxane, but is preferably employed in a range of 2.5 to 5 mol % of the polymer.

The final unit in the siloxane polymer is the vinyl-containing siloxane unit. It is essential that this unit be the dimethylvinylsiloxane (Me$_2$ViSiO$_{.5}$) featuring the vinyl function in a terminal position. The primary reason for using a terminal vinyl group instead of an internal vinyl group (i.e., MeViSiO) is to increase the cure rate. The rate constant of hydrosilation is doubled by going from the internal vinyl to the terminal vinyl group. The terminal vinyl unit also functions as an endblocker in conjunction with the trimethylsiloxane units discussed above. This terminal vinyl siloxane unit can provide 0.25 to 4 mol % of the total organosiloxane units in the polymer.

Because the terminal vinyl unit and the trimethylsiloxane units are endblockers of the organosiloxane polymer, it is essential that all triorganosiloxane units provide no more than 10 mol % of the total polyorganosiloxane.

Preferred curable siloxane compositions are those wherein the polyorganosiloxane consists essentially of 87 to 94 mol % of (CH$_3$)$_2$SiO, 3 to 6 mol % of CH$_3$SiO$_{1.5}$, 2.5 to 5 mol % of (CH$_3$)$_3$SiO$_{0.5}$, and 0.5 to 2.0 mol % of (CH$_3$)$_2$(CH$_2$=CH)SiO$_{0.5}$, and especially polyorganosiloxanes consisting of 92 to 94 mol % of (CH$_3$)$_2$SiO, 3 to 4 mol % of CH$_3$SiO$_{1.5}$, 2.5 to 3 mol % of (CH$_3$)$_3$SiO$_{0.5}$, and 0.5 to 1 mol % of (CH$_3$)$_2$(CH$_2$=CH)SiO$_{0.5}$.

The vinyl functionality on the polyorganosiloxane will react with a suitable crosslinker in the presence of a catalyst and cure to form a gel-like substance. A suitable crosslinker for the polyorganosiloxane employed in the present invention is an organohydrogensiloxane featuring the reactive moiety, ≡SiH. The required crosslinker will have an average of more than 1 silicon-bonded hydrogen atom per molecule and no more than 1 silicon-bonded hydrogen atom per silicon atom. The other substituents on the silicon atom will be organic radicals typically selected from the group consisting of alkyl radicals having from 1 to 6 carbon atoms per radical, phenyl and 3,3,3-trifluoropropyl. The quantity of crosslinker employed should be sufficient to provide 0.2 to 5.0 mols of ≡SiH per mole of ≡SiVi. A molar ratio within the range of 0.5/1 to 0.95/1 has proved to be very satisfactory, but that is a result of the functionality of the preferred crosslinkers which contain at least two ≡SiH moieties per molecule.

An example of an organohydrogensiloxane compound which can be employed in the practice of the present invention is 1,3,5,7-tetramethylcyclotetrasiloxane which contains one silicon-bonded methyl group and one silicon-bonded hydrogen atom per silicon atom. This cyclic polymer is made by hydrolysis is MeHSiCl$_2$. Another crosslinker is a dimethylhydrogensiloxane endblocked polydimethylsiloxane, HMe$_2$Si(OMe$_2$Si)$_x$H, where x=1–30. This polymer is made by cohydrolysis of HMe$_2$SiCl and Me$_2$SiCl$_2$ or equilibration of HMe$_2$SiOSiMe$_2$H and (Me$_2$SiO)$_4$. A further type of crosslinking composition is one which comprises a polymer of dimethylsiloxane units, methylhydrogensiloxane units and trimethylsiloxane units and which contains at least 4 and as many as 20 or more silicon atoms per molecule. This composition is made by equilibration of Me$_3$SiO(MeHSiO)$_x$SiMe$_3$ and (Me$_2$SiO)$_4$.

The preferred organohydrogensiloxanes are those of the formula

$$H(CH_3)_2Si[OSi(CH_3)_2]_xOSi(CH_3)_2H$$

in which x is 5 to 20. These organohydrogensiloxanes are used to make the preferred embodiments of this invention by crosslinking the preferred polyorganosiloxanes in the presence of a platinum catalyst to obtain gels. The most preferred ratio of silicon-bonded hydrogen to silicon-bonded vinyl is 0.5/1 to 0.95/1.

The platinum catalyst employed in the present invention includes all of the well-known platinum catalysts that are effective for catalyzing the reaction between silicon-bonded hydrogen and vinyl groups. These materials include the chloroplatinic acid catalyst described in U.S. Pat. No. 2,823,218, issued Feb. 11, 1958, to Speier et al., and the reaction products of chloroplatinic acid and an organosilicon compound such as those described by Willing in U.S. Pat. No. 3,419,593, issued Dec. 31, 1968. Also applicable are the platinum hydrocarbon complexes shown in U.S. Pat. No. 3,159,601, issued Dec. 1, 1964, and 3,159,662, issued Dec. 1, 1964, to Ashby, the platinum acetyl acetonate shown in U.S. Pat. No. 3,723,497, issued Mar. 27, 1973, to Baney and the platinum alcoholate catalysts described by Lamoreaux in U.S. Pat. No. 3,220,972, issued Nov. 30, 1965.

For any of the particular platinum catalysts selected, the practitioner will be able to determine an optimum catalytically effective amount to promote curing. Platinum catalysts have been used effectively in amounts sufficient to provide from about 0.1 to 40 parts by weight of platinum per million parts by weight of total formulation. We have found the particular platinum catalyst described in Example I of the patent to Willing, supra, to be particularly effective when employed so as to provide between 5 and 10 parts by weight of the platinum atom per million parts by weight of the total formulation.

In order to achieve a greater working time, the practitioner may want to vary the cure rates by the use of certain classes of compounds well known in the art, such as the aromatic heterocyclic nitrogen compounds, pyridazine, pyrazine, quinoline, 2,2'-biquinoline, bipyridine, naphthyridine, quinaldine, dialkyl formamides, thioamides, alkylthioureas and ethylene thiourea described in U.S. Pat. No. 3,188,299, issued June 8, 1965, the organophosphorus compounds as described in U.S. Pat. No. 3,188,300, issued June 8, 1965, benzotriazole as described in U.S. Pat. No. 3,192,181, issued June 29, 1965, the nitrile compounds as described in U.S. Pat. No. 3,344,111, issued Sept. 26, 1967, the halocarbons described in U.S. Pat. No. 3,383,356, issued May 14, 1968, the acetylenic compounds described in U.S. Pat. No. 3,445,420, issued May 20, 1969, the vinyl silazanes described in U.S. Pat. No. 3,453,233, issued July 1, 1969, the sulfoxide compounds described in U.S. Pat. No. 3,453,234, issued July 1, 1969, the stannous salts, the mercuric salts, the bismuth (+3) salts, the cuprous salts and the cupric salts described in U.S. Pat. No. 3,532,649, issued Oct. 6, 1970, the polymethylvinylsiloxane cyclics discussed in U.S. Pat. No. 3,923,705, issued Dec. 2, 1975, and others which may be known in the art. The patents cited above are hereby incorporated by reference to include the methods of using the platinum catalyst inhibitors, the specific platinum catalyst inhibitors and additional detailed description of platinum catalyst.

The polyorganosiloxane, which is unique to the present invention, can be prepared by the cohydrolysis of the corresponding chlorosilanes or by equilibration of a combination of siloxane compositions that will give the desired mol ratio of components. This latter technique, employing potassium silanolate as the equilibrium catalyst, is preferred.

A polyorganosiloxane, typical of the present invention, can be prepared by equilibration according to the following example:

EXAMPLE I

Copolymer A

A mixture containing 61.2 g of $Me_2ViSi(OSiMe_2)_6OSiViMe_2$, 236.2 g of $Me_3Si(OSiMe_2)_2OSiMe_3$ and 937.4 g of $(Me_2SiO)_x$ cyclics wherein X is 4 to 6 was equilibrated, with a $N_2$ purge, for one hour at 160° C. using potassium silanolate (KOSi≡) as the equilibrium catalyst in a ratio of 1 K/2,500Si. While maintaining the temperature and stirring constantly, 765 g of a hydrolyzate containing $MeSiO_{1.5}$ (21.3 wt. %), $Me_2SiO$ (74.1 wt. %), and $Me_3SiO_{0.5}$ (4.6 wt. %) was added slowly and the resulting mixture was allowed to equilibrate for three hours. The reaction mixture was neutralized with $CO_2$ and filtered. The polymer demonstrated a viscosity of about 0.0002 m$^2$/s.

Copolymer B

The equilibration procedure was duplicated using 61.2 g of $Me_2ViSi(OSiMe_2)_6OSiViMe_2$, 24.7 g of $Me_3Si(OSiMe_2)_2OSiMe_3$ and 1853.3 g of $(Me_2SiO)_x$ cyclics wherein x is 4 to 6 and 170.8 g of the hydrolyzate used in the preparation of Copolymer A. The reaction mixture was neutralized and filtered. The resulting polymer demonstrated a viscosity of about 0.002 m$^2$/s.

| Formula Copolymer A | |
|---|---|
| $MeSiO_{1.5}$ | 9.0 mol % |
| $Me_2ViSiO_{.5}$ | 0.75 mol % |
| $Me_3SiO_{0.5}$ | 7.25 mol % |
| $Me_2SiO$ | 83 mol % |
| Formula Copolymer B | |
| $MeSiO_{1.5}$ | 2.0 mol % |
| $Me_2ViSiO_{0.5}$ | 0.75 mol % |
| $Me_3SiO_{0.5}$ | 0.95 mol % |
| $Me_2SiO$ | 96.30 mol % |

Copolymers A and B were then physically blended to produce polyorganosiloxanes having various viscosities and siloxane unit compositions. Two typical polymers resulting from such a blend include Polymer Blends I and II.

| Reference | Components | Mol % |
|---|---|---|
| Polymer Blend I | $MeSiO_{1.5}$ | 5.62 |
| | $ViMe_2SiO_{0.5}$ | 0.75 |
| | $Me_3SiO_{0.5}$ | 4.03 |
| | $Me_2SiO$ | 89.60 |

| Reference | Components | Mol % |
|---|---|---|
| | Resulting Viscosity, 0.00072 m$^2$/s | |
| Polymer Blend II | $MeSiO_{1.5}$ | 5.0 |
| | $ViMe_2SiO_{0.5}$ | 0.75 |
| | $Me_3SiO_{0.5}$ | 3.82 |
| | $Me_2SiO$ | 90.43 |
| | Resulting Viscosity, 0.00074 m$^2$/s | |

Samples of polyorganosiloxanes denominated as Polymer Blend I and Blend II were formulated into gels according to the present invention by first weighing an appropriate amount of the polymer and adding the platinum catalyst. The composition was stirred and the crosslinking compound was added. The mixture was then transferred to smaller containers for curing in a heated oil bath.

Specifically, siloxane compositions were formed by mixing and curing Reference Polymer Blend I and Polymer Blend II with a crosslinker having the formula $HMe_2Si(OSiMe_2)_{~14}OSiMe_2H$ and a platinum catalyst prepared by reacting sym-divinyltetramethyldisiloxane with chloroplatinic acid as described in Example I of the Willing Patent, supra. The particular platinum catalyst complex we used contained 0.85 wt. % platinum.

The penetration was measured in 0.1 mm units using a Precision Penetrometer with a 4.5 g probe attached to a 15 g plunger. The penetration of the probe into a 50 g gel sample, cured for ½ hour at 150° C., was measured. Penetration readings were taken after 5 seconds. A high penetration reading (over 10.0 mm) indicates a "soft" gel, whereas a low penetration reading (<3 mm) indicates a "hard" gel.

Cure time of the gel was determined using a Tecam Gelation Timer with a ⅞" spindle. The spindle was inserted in a 100 g. sample immersed in a 135° C. oil bath. Increasing resistance on the spindle was generated by the formation of the gel (curing), and the period of time necessary to trip the timer on the spindle was recorded.

The low temperature properties of the gels were measured by a DuPont 900 Differential Thermal Analysis Calorimeter (DTA). A 20 mg gel sample, cooled to −140° C. with liquid nitrogen, was heated with the DTA at the rate of 10° C. per minute.

Tables I and II depict the compositions and characteristics of a number of gels made according to the claimed invention.

TABLE I

Compositions and Properties of Gels Using Reference Polymer Blend I

| Gel Formulation | | | | Gel Properties | | |
|---|---|---|---|---|---|---|
| Polymer (g.) | Crosslinker (g.) | Pt Catalyst (ppm) | Moles SiH / Moles SiVi | Penetration (mm) | Cure Time (Min.) | Tg (°C.) |
| 50 | 1.47 | 10 | 0.5 | 21.0 | — | — |
| 50 | 1.76 | 10 | 0.6 | 14.2 | — | — |
| 50 | 2.08 | 10 | 0.7 | 7.2 | — | −120 |
| 100 | 4.16 | 10 | 0.7 | — | 4.7 | — |

TABLE II

Compositions and Properties of Gels Using Reference Polymer Blend II

| Gel Formulation | | | | Gel Properties | | |
|---|---|---|---|---|---|---|
| Polymer (g.) | Crosslinker (g.) | Pt Catalyst (ppm) | Moles SiH / Moles SiVi | Penetration (mm) | Cure Time (Min.) | Tg (°C.) |
| 50 | 1.76 | 6 | 0.6 | 22.5 | — | — |
| 50 | 2.08 | 6 | 0.7 | 12.8 | — | — |
| 50 | 2.38 | 6 | 0.8 | 6.7 | — | −120 |
| 100 | 4.76 | 6 | 0.8 | — | 4.5 | — |

From the foregoing it was observed that the gels prepared according to the claimed invention passed from a glass phase to a liquid phase at about −120° C. (Tg). No intermediate crystalline phase was observed.

EXAMPLE II

To illustrate the essential features of the polyorganosiloxane to be employed in the formulation of a siloxane gel according to the present invention, the following gel was prepared and evaluated:

Comparative Formulation

Polymer A, consisting of $ViMe_2SiO-$ endblocked polydimethylsiloxane, $ViMe_2Si(OMe_2Si)_xOSiMe_2Vi$, having a vinyl content of 0.22 wt. % and a viscosity of 0.002 m²/s was mixed with Polymer B, consisting of 9 mol % $MeSiO_{1.5}$, 0.75 mol % $ViMe_2SiO_{0.5}$, 6.57 mol % $Me_3SiO_{0.5}$ and 83.68 mol % $Me_2SiO$, having a vinyl content of 0.27 wt. % and a viscosity of 0.00019 m²/s. Polymers A and B were blended in a ratio of 1:1 by weight.

Fifty grams of the polymer blend were mixed with 0.37 g of $\equiv SiH$ crosslinker having an average formula of $Me_3Si(OMe_2Si)_3(OMeHSi)_5OSiMe_3$ and the platinum catalyst described in Example I of the Willing Patent, supra, 12 parts by weight platinum per million parts by weight of the final admixture. This procedure was performed in the same manner described in U.S. Pat. No. 3,020,260, supra, Example 10.

The resulting admixture was divided into portions I and II. Portion I was left at room temperature. It cured to form a gel in 45 minutes. Portion II was cured at 150° C. for 30 minutes.

The Penetrometer readings on the resulting gels were 4.1 mm. The phase transition temperature analysis using the differential scanning colorimeter showed phase transitions at −50° C. and −120° C. representing melting temperature and glass transition temperature respectively. These two transition temperatures indicate that the gels are capable of maintaining their low temperature structural integrity down to only −50° C. At temperatures below that point, the gel hardens because of the formation of a crystalline phase.

It is believed that the formation of the crystalline phase is a result of the absence of $MeSiO_{1.5}$ in Polymer A. Furthermore, even though Polymer B had 9 mole % of $MeSiO_{1.5}$ units, the resulting polyorganosiloxane was a physical blend of methyl and vinyl siloxy units and not a siloxane polymer composed of each of the required units.

While the compositions of the present invention can be prepared by merely mixing the various components together in any desired fashion as previously described, it is often found most convenient to prepare these compositions in two separate portions or packages which are combined at the time the compositions are to be converted to the cured gel state. In the case of the two-package formulation, it is convenient to include in the first package the organopolysiloxane component and the platinum catalyst. The second package can contain the organohydrogensiloxane, and as matter of convenience a portion of the organopolysiloxane. In selecting the contents of the two packages, one should not include both the platinum catalyst component and the organohydrogensiloxane component in the same package.

The following example illustrates a preferred embodiment of the present invention.

EXAMPLE III

| Curable Gel Composition | |
|---|---|
| Polymer Blend II | 100 parts by wt. |
| Crosslinker $(HMe_2Si(OSiMe_2)_{\sim 14}OSiMe_2H)$ | 5.14 parts by wt. |
| Platinum Catalyst | .0946 parts by wt. |
| $(MeViSiO)_4$ | .0294 parts by wt. |

As a matter of convenience, it is desirable to package the curable gel composition in two parts. The following shows the contents of each part:

Part A

Polymer Blend II: 50 g
Platinum Catalyst: 0.09 g

Part B

Polymer Blend II: 45.11 g
Crosslinker: 4.89 g
$(MeViSiO)_4$: 0.028 g

To cure, parts A and B were mixed in a 1:1 weight ratio and the following properties were evaluated:
Cure Time @ 135° C. 100 g=6.1 min.
Penetration on Sample Cured 30 min.
@ 150° C.=4.5 mm.
Cure Time @ 25° C.=5 hours A cured gel within the scope of the present invention and prepared according to the foregoing examples can be used advantageously as a conformal coating to protect electronic circuitry where low temperature stability is important, such as in aerospace electronics. Using a protective coating with low temperature stability is important because it has been observed that a physical change in the protective coating, such as from a gel phase to a crystalline phase, can disrupt and damage the enveloped circuits.

That which is claimed is:

1. A curable siloxane composition comprising an intimate mixture consisting essentially of:
    (1) a polyorganosiloxane consisting essentially of 80 to 96.5 mol % of $(CH_3)_2SiO$, 2.0 to 10.0 mol % of $CH_3SiO_{1.5}$, 1.25 to 6.0 mol % of $(CH_3)_3SiO_{0.5}$, and 0.25 to 4.0 mol % of $(CH_3)_2(CH_2=CH)SiO_{0.5}$;
    (2) an organohydrogensiloxane having an average of more than one silicon-bonded hydrogen atom per molecule and no more than one silicon-bonded hydrogen atom per silicon atom and organic radicals selected from the group consisting of alkyl radicals having from one to six carbon atoms per radical, phenyl and 3,3,3-trifluoropropyl, said organohydrogensiloxane providing an average of 0.2 to 5.0 moles of silicon-bonded hydrogen per mole of silicon-bonded vinyl; and (3) a platinum catalyst.

2. The curable siloxane composition according to claim 1 wherein the polyorganosiloxane consists essentially of 87 to 94 mol % of $(CH_3)_2SiO$, 3 to 6 mol % of $CH_3SiO_{1.5}$, 2.5 to 5 mol % of $(CH_3)_3SiO_{0.5}$, and 0.5 to 2.0 mol % of $(CH_3)_2(CH_2=CH)SiO_{0.5}$.

3. The curable siloxane composition according to claim 2 wherein the polyorganosiloxane consists essentially of 92 to 94 mol % of $(CH_3)_2SiO$, 3 to 4 mol % of $CH_3SiO_{1.5}$, 2.5 to 3 mol % of $(CH_3)_3SiO_{0.5}$, and 0.5 to 1 mol % of $(CH_3)_2(CH_2=CH)SiO_{0.5}$.

4. The curable siloxane composition according to claim 2 wherein the polyorganosiloxane consists essentially of 90.5 mol % of $(CH_3)_2SiO$, 5.0 mol % of $CH_3SiO_{1.5}$, 3.8 mol % of $(CH_3)_3SiO_{0.5}$, and 0.7 mol % of $(CH_3)_2(CH_2=CH)SiO_{0.5}$.

5. The curable siloxane composition according to claim 1, 2, 3, or 4 wherein the organohydrogensiloxane is $H(CH_3)_2Si[OSi(CH_3)_2]_xOSi(CH_3)_2H$, wherein x is within the range of 5 to 20.

6. The curable siloxane composition according to claim 1, 2, 3, or 4 wherein the organohydrogensiloxane is $H(CH_3)_2Si[OSi(CH_3)_2]_xOSi(CH_3)_2H$ wherein x is within the range of 5 to 20, and said organohydrogensiloxane provides an average of 0.5 to 0.95 moles of silicon-bonded hydrogen per mole of silicon-bonded vinyl.

7. The curable siloxane composition according to claim 1 wherein the platinum catalyst provides between 5 and 10 parts of the platinum atom per million parts of the total formulation.

8. The curable siloxane composition according to claim 6 wherein the platinum catalyst provides between 5 and 10 parts by weight of the platinum atom per million parts by weight of the total formulation.

9. The cured product of claim 1, 2, 3, or 4.

10. The cured product of claim 8.

* * * * *

UNITED STATES PATENT AND TRADEMARK OFFICE
CERTIFICATE OF CORRECTION

PATENT NO. : 4,374,967
DATED : February 22, 1983
INVENTOR(S) : Paul L. Brown, Chi-Long Lee, and Myron T. Maxson It is certified that error appears in the above-identified patent and that said Letters Patent is hereby corrected as shown below:

Col. 2, line 33 -"$CH_3SiO_{0.5}$," should read ---$CH_3SiO_{1.5}$,---

Signed and Sealed this

Third Day of January 1984

[SEAL]

*Attest:*

*Attesting Officer*

GERALD J. MOSSINGHOFF

*Commissioner of Patents and Trademarks*